United States Patent [19]

Maruyama et al.

[11] Patent Number: 4,655,999
[45] Date of Patent: Apr. 7, 1987

[54] CONTROL ROD FOR NUCLEAR REACTOR

[75] Inventors: Hiromi Maruyama, Katsuta; Tadahiro Ohnishi, Hitachi, both of Japan

[73] Assignee: Hitachi, Ltd., Tokyo, Japan

[21] Appl. No.: 622,727

[22] Filed: Jun. 20, 1984

[30] Foreign Application Priority Data

Jun. 22, 1983 [JP] Japan ............... 58-110775

[51] Int. Cl.⁴ .................................................. G21C 7/10
[52] U.S. Cl. .................................................... 376/333
[58] Field of Search .............................. 376/327, 333

[56] References Cited

U.S. PATENT DOCUMENTS

| 3,103,479 | 9/1963 | Ransohoff | 376/333 |
| 3,365,368 | 1/1968 | Fray | 376/333 |
| 4,285,769 | 8/1981 | Specker et al. | 376/333 |

FOREIGN PATENT DOCUMENTS

| 0066190 | 6/1977 | Japan | 376/333 |
| 0074697 | 7/1978 | Japan | 376/333 |
| 0132099 | 10/1979 | Japan | 376/327 |
| 0011387 | 2/1981 | Japan | 376/333 |
| 0140288 | 11/1981 | Japan | 376/333 |

Primary Examiner—Harvey E. Behrend
Attorney, Agent, or Firm—Antonelli, Terry & Wands

[57] ABSTRACT

A control rod for a nuclear reactor according to the present invention is such that neutron absorbing rods are surrounded with a second neutron absorber which differs in material from the neutron absorbing rods. In a case where the neutron absorbing rod is composed of boron carbide powder and a cladding for receiving the powder therein, the second neutron absorber is a sheet of a material having a neutron irradiation lifetime longer than that of boron carbide, for example, hafnium. In a case where the neutron absorbing rod is a round hafnium rod, the second neutron absorber having a neutron absorption worth higher than that of hafnium is located so as to surround the round hafnium rods. Thus, the neutron absorbing rods are effectively used, and the lifetime of the control rod can be prolonged in the former.

16 Claims, 15 Drawing Figures

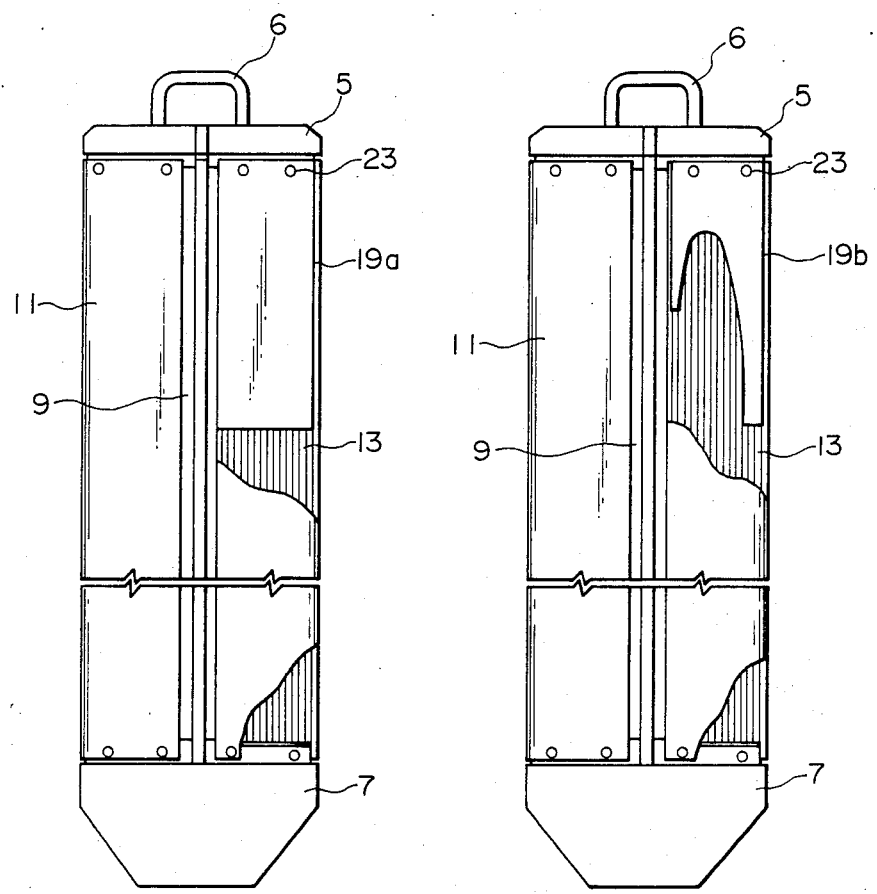

CONTROL ROD FOR NUCLEAR REACTOR

BACKGROUND OF THE INVENTION

The present invention relates to a control rod which is used for the reactivity control and the power distribution control in a nuclear reactor.

A nuclear reactor has an excess reactivity in anticipation of the lowering of its reactivity due to the burn-up of fuel, etc. In order to operate the nuclear reactor having the excess reactivity under a sufficiently controlled state, a minus reactivity which is necessary for canceling the excess reactivity and further for reliably shutting down the reactor needs to be prepared. The minus reactivity is achieved by inserting a neutron absorber, for example, a control rod into the reactor core. The control rod is also used for absorbing neutrons in a place of high power within the reactor, thereby to flatten the power distribution and to secure a thermal margin during the operation of the nuclear reactor.

A control rod presently employed in a boiling water reactor is a cruciform control rod constructed of control rod sheaths which are made of stainless steel, and neutron absorbing rods in which the powder of boron carbide ($B_4C$) is packed in slender tubes of stainless steel. The neutron absorbing rods numbering about 20 are arranged in a row in each of control wings.

The isotope $^{10}B$ of boron contained in boron carbide has as large an absorption cross section as about 3800 barns for thermal neutrons, and absorbs neutrons through the (n, α) reaction. Therefore, the control rod employing the boron carbide has a high reactivity. As other merits, since the boron carbide is comparatively inexpensive and light, the control rod is low in price and light in weight.

In the control rod of the boiling water reactor, neutron radiation amounts within the control rod are not always uniform, but particularly the neutron radiation amounts in the top end part of the control rod and the outer end parts of the wings are large. For this reason, $^{10}B$ in these parts degrades much faster than in the other parts.

In the boiling water reactor, the lifetime of the control rod is stipulated to be the point of time at which the reactivity degradation of a position of $\frac{1}{4}$ of the effective length of the control rod has reached 10% of the initial reactivity, and the control rods having reached the lifetime or those anticipated to reach the lifetime in the next operation cycle are exchanged at the routine inspection of the nuclear reactor. Usually, the lifetime of the control rod is determined by the point of time at which the top end part of the control rod has reached the aforementioned condition, because the decrease of $^{10}B$ at the top end of the control rod is fast as stated before.

Further, in recent years, the prolongation of the operation cycle and the continuous use of the same control rods (an operation in which the control rod pattern is changed less frequently) have been required for achieving enhancement in the plant factor and simplification in the operation. In a case where the control rods presently used are applied to such operation, the number of the control rods to be exchanged every operation cycle becomes large. Control rods of long lifetime have therefore been requested.

As a control rod whose lifetime has been prolonged, Japanese Laid-open Patent Application No. 53-74697 discloses a control rod in which the neutron absorber at the top end thereof is replaced with a neutron absorber of slow degradation such a hafnium and europium. As compared with the boron carbide, however, the hafnium and the europium are as heavy as about 7 times and about 4 times in the specific gravity, respectively, and they are very expensive. Another disadvantage is that they are lower than $^{10}B$ in the neutron absorptivity.

In general, it is improper to employ a metallic absorber, e.g., the hafnium as a structural material such as the control rod sheath or the clad tube of the absorbing rod. The structural material has such necessary conditions that its mechanical strength is sufficient because it bears a strength needed for the structure, and that a required shape is readily obtained by plastic working, welding, etc. For example, the hafnium is hard to be worked and is difficult of welding with stainless steel which is the supporting material of the control rod.

SUMMARY OF THE INVENTION

An object of the present invention is to provide a control rod for a nuclear reactor having a long lifetime.

Another object of the present invention is to eliminate the disadvantages of the prior arts described above, and to provide a control rod which has a long lifetime while keeping the merits of the control rod that employs the inexpensive and light boron carbide.

Still another object of the present invention is to provide a control rod which uses a neutron absorber longer in lifetime than the boron carbide and the neutron reactivity worth of which is high.

The control rod of the present invention for accomplishing the objects is characterized in that, besides a first and principal neutron absorber which forms neutron absorbing rods, a second neutron absorber is arranged which differs in material from the first neutron absorber and which surrounds the neutron absorbing rods. Usable as the second neutron absorber are long lifetime type neutron absorbers such as hafnium and europium, and besides, cadmium, an Ag-In-Cd alloy, boron-containing stainless steel, etc.

Neutrons are produced by the nuclear fission of a fissile material in a fuel rod, and reach the control rod while being slowed down by a moderator. The second neutron absorber in the present invention absorbs some of the neutrons having reached the control rod, and functions to reduce the neutron radiation amounts of the neutron absorbing rods. As a result, the degradation of the neutron absorbing substance in the neutron absorbing rods is retarded, and the prolongation of the control rod lifetime can be achieved.

In addition, to the arrangement of the second neutron absorber decreases the neutron absorption amounts of the neutron absorbing rods, but it increases the neutron absorption quantity with respect to the whole control rod. Accordingly, even in a case where a neutron absorbing substance lower in the neutron absorptivity than the boron carbide is employed as the principal neutron absorber rod material, the neutron absorptivity of the control rod is compensated for by the second neutron absorber, and the control rod of high reactivity worth can be provided.

BRIEF DESCRIPTION OF THE DRAWINGS

FIG. 5 is a front view, partly cut away, showing another embodiment of a control rod for a nuclear reactor according to the present invention;

FIG. 6 is a front view, partly cut away, of a control rod for a nuclear reactor which is another embodiment of the present invention;

PREFERRED EMBODIMENTS OF THE INVENTION

Before explaining the embodiments of the present invention, the typical neutron radiation amount distribution of a cruciform control rod for use in a boiling water reactor will be described with reference to FIG. 1.

Figure 1:
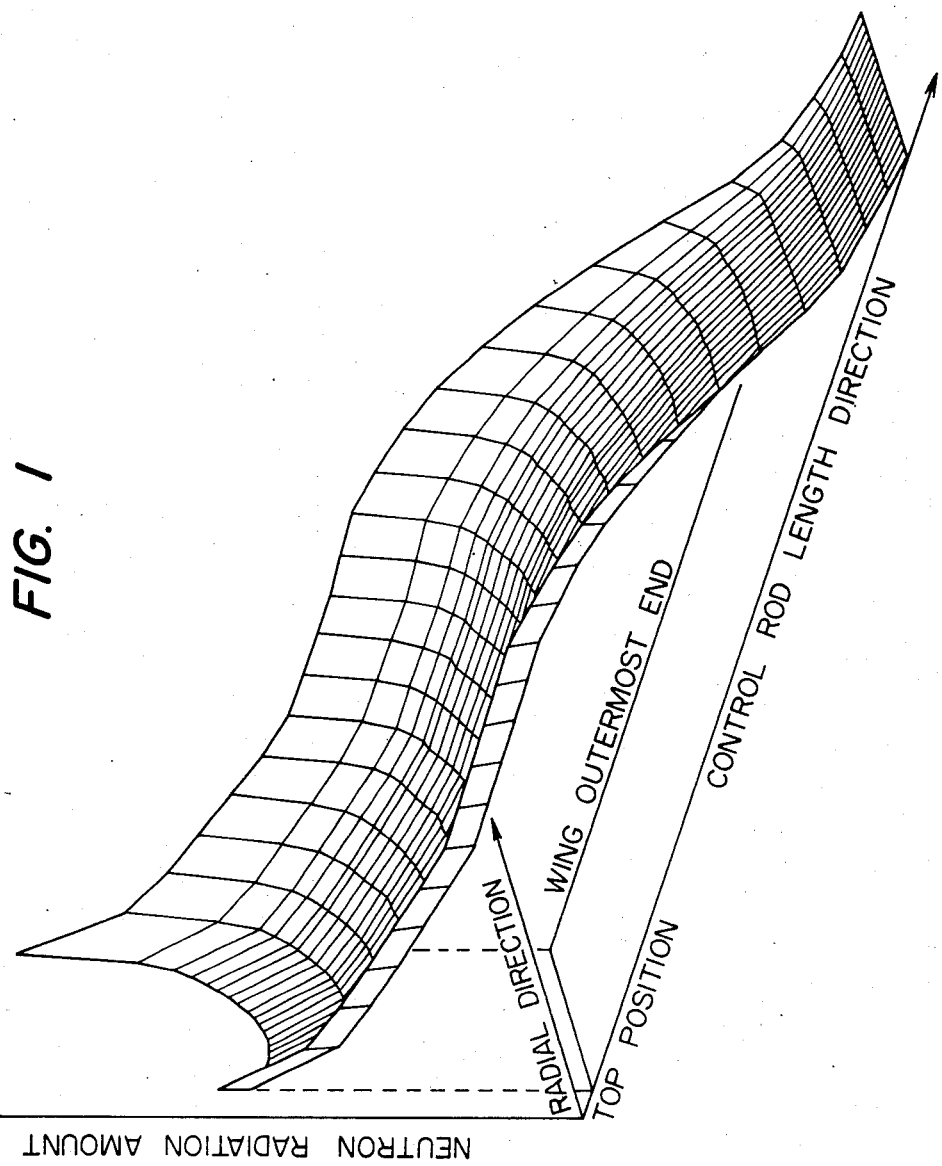
FIG. 1 is a diagram showing the neutron radiation amount distribution of a control rod for use in a boiling water reactor.

In FIG. 1, the neutron radiation amount distribution is illustrated for one of the four wings of the cruciform control rod. The neutron radiation amount decreases gradually from the top end toward the bottom end of the control rod, and in the top end part, it is large at the center of the control rod and the outermost end of the wing. In particular, the neutron radiation amount at the wing outermost end in the top end part of the control rod is large. Since, as stated before, the decrease of $^{10}B$ at the control rod top end of the large neutron radiation amount is fast, the lifetime of the control rod is determined by the reactivity degradation of the top end part of the control rod.

Next, one embodiment of the control rod for a nuclear reactor according to the present invention will be described with reference to FIGS. 2 and 3.

Figure 2:
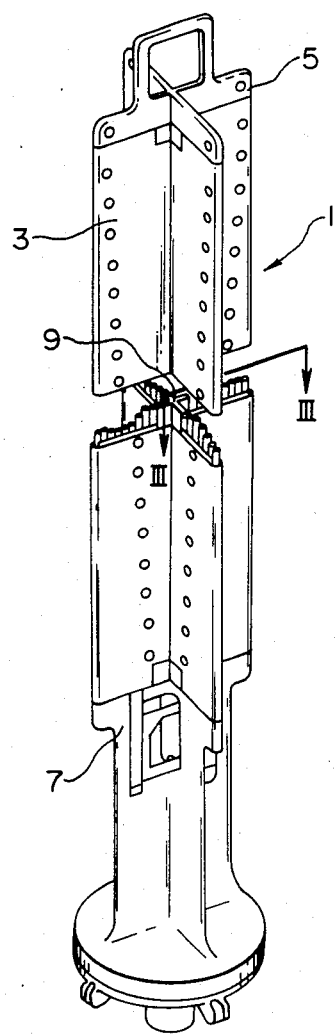
FIG. 2 is a perspective view of a cruciform control rod for a boiling water reactor showing an embodiment of the present invention.

In FIG. 2, a cruciform control rod 1 is cruciform in cross section, and it is composed of a neutron absorbing rod-receiving portion 3, an upper supportion portion 5 which overlies the portion 3, and a lower supporting portion 7 which underlies the portion 3. The neutron absorbing rod-receiving portion 3 is made up of four control blades or wings which are fixed to a central supporting member 9. As shown in FIG. 3, each of the control blades is constructed of a control rod sheath 11 which is mounted on the central supporting member 9 made of stainless steel, twenty-one neutron absorbing rods 13 which are arranged in a row inside the control rod sheath 11, and a pair of members 19 which are made of a second neutron absorber and which are respectively inserted between the control rod sheath 11 and the row of the neutron absorbing rods. The neutron absorbing rod 13 consists of a clad tube 15 of stainless steel, and boron carbide powder 17 packed in the clad tube, and it forms a principal neutron absorber. The member of the second neutron absorber 19 is a hafnium sheet which has a thickness of 0.3 mm, a width substantially equal to that of the neutron absorbing rod row, and a length substantially equal to that of the neutron absorbing rod row. The sheets 19 are carried along with the neutron absorbing rods 13 by the supporting plate of the lower supporting portion 7 so as not to be subjected to any external mechanical force. The upper supporting portion 5 is formed of an upper supporting member with a handle, and it is fixed to the sheath 11 and the central supporting member 9 after the neutron absorbing rods 13 and the hafnium sheets 19 have been inserted. The hafnium sheets 19 can be readily inserted into and drawn out of the control rod sheath by detaching the upper supporting member 5.

Figure 3:
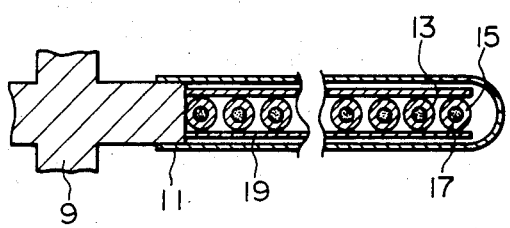
FIG. 3 is a sectional view taken along line III—III in FIG. 2.
Figure 4:
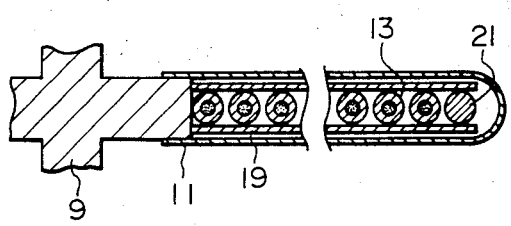
FIG. 4 is a sectional view of a control rod showing another embodiment of the present invention.

Shown in FIG. 4 is a modification of the control rod for a nuclear reactor in FIG. 3. In this modified embodiment, the neutron absorbing rod located at the wing outermost end of the largest neutron radiation amount is a rod 21 which is made of hafnium. The others are quite the same as in the embodiment of FIGS. 2 and 3. That is, the same neutron absorbing rods 13 as in the foregoing, but numbering twenty, and one hafnium rod 21 at the wing outermost and are inserted in the control rod sheath 11 which is fixed to the central supporting member 9, and one pair of hafnium sheets 19 each of which is 0.3 mm thick are inserted between the neutron absorbing rods 13, 21 and the sheath 11.

FIG. 5 shows a modification 19a of the hafnium sheet 19 in the embodiment of FIGS. 2 and 3 or the embodiment of FIG. 4, along with a mounting example thereof. The hafnium sheet 19a is mounted on an upper supporting member 5 unitary with a handle 6, by such joining means 23 as screws. The hafnium sheet of 19a is in the shape of a rectangle whose length is about ¼ of the effective length of the neutron absorbing rod. However, the shape of the hafnium sheet need not always be rectangular, but it can be put into a shape which covers parts of large neutron radiation amounts as shown in FIG. 6 in accordance with the neutron radiation amount distribution in FIG. 1. The upper end of this hafnium sheet 19b is fixed to the upper supporting member 5 by the joining means 23, while the lower end conforms with the distribution of the neutron radiation amounts. That is, the hafnium sheet 19b is so shaped that its parts corresponding to the central part of the control rod and the outermost end of the wing are long, whereas its part between them is short. The longest part has the length of about ¼ of that of the neutron absorbing rod.

Figure 7:
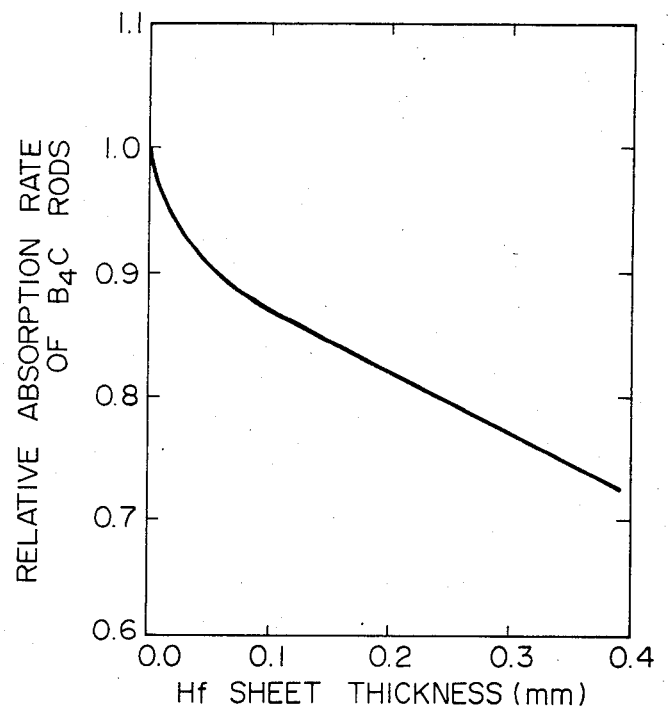
FIG. 7 is a graph showing the neutron absorptivity variation of neutron absorbing rods attendant upon increase in the thickness of hafnium sheets.

FIG. 7 shows the relative absorption rate of the neutron absorbing rod owing to the hafnium sheet 19, 19a or 19b described above. When a sheet being 0.3 mm thick is used as the hafnium sheet, the neutron flux within the neutron absorbing rod decreases by about 20%. Accordingly, the degradation of the neutron absorbing substance in the neutron absorbing rod equalizes so that of the prior-art control rod having no hafnium sheet with a neutron radiation amount which is about 1.2 times larger than the neutron radiation amount that the prior-art control rod undergoes till arrival at its lifetime. That is, under the same irradiation condition, the lifetime of the control rod of the present invention becomes about 1.2 times longer than that of the prior-art control rod. The weight of one hafnium sheet shown in FIG. 5 is about 370 gr., and that of the same shown in FIG. 6 is lighter. The hafnium sheets have slight influence on the weight of the control rods because one hafnium sheet is light even when compared with one neutron absorbing rod of hafnium which is about 870 gr. in weight.

Figure 8:
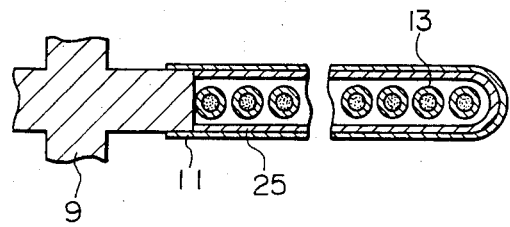
FIG. 8 is a sectional view of a control rod for a nuclear reactor in another embodiment of the present invention.
Figure 9:
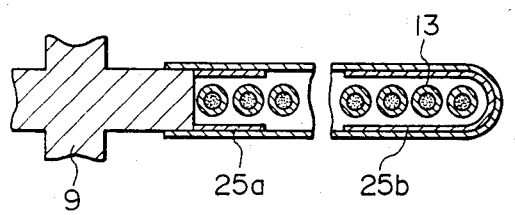
FIG. 9 shows a modification of the embodiment in FIG. 8.

FIG. 8 shows an embodiment of the control rod for a nuclear reactor according to the present invention wherein the inner side of a control rod sheath 11 is lined with a neutron absorber. The neutron absorber 25 may be, for example, an alloy which contains amorphous boron or cadmium. When the inner side of the control rod sheath is lined with the neutron absorber, there is the merit that the neutron absorber can be distributed in the control rod as is necessary as illustrated in FIG. 9. By way of example, a structure can be formed wherein neutron absorbing plates 25a of comparatively small width are arranged in the inner end part of the wing and a neutron absorbing plate 25b of comparatively great width in the outer end part of the wing, with no neutron absorber disposed between them.

Figure 10:
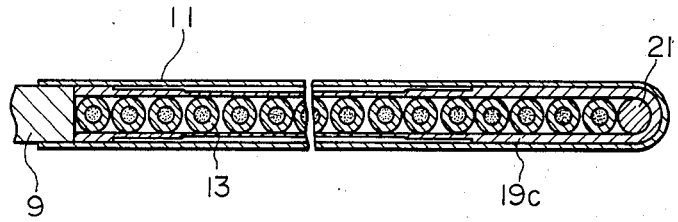
FIG. 10 is a sectional view of a control rod for a nuclear reactor in another embodiment of the present invention.
Figure 11:
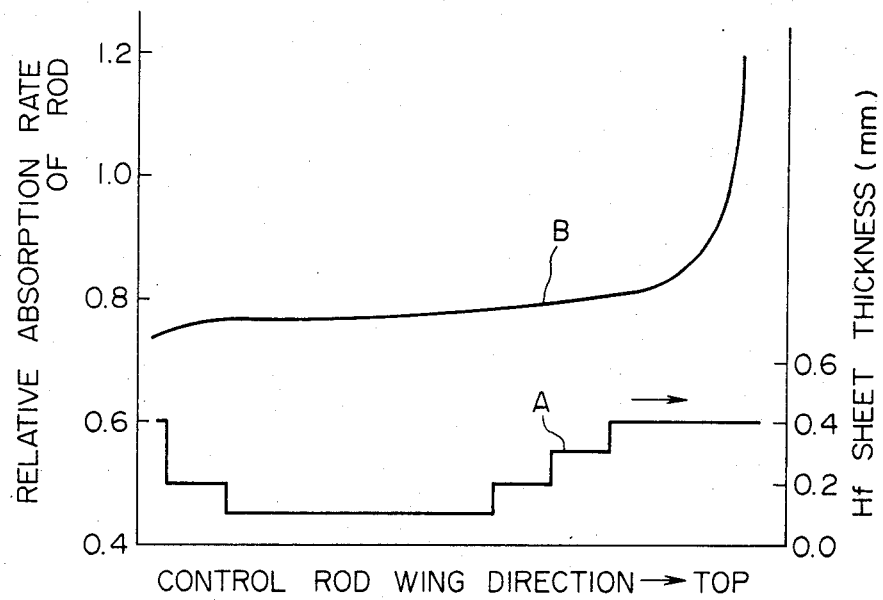
FIG. 11 is a graph showing the relative neutron absorption rates of neutron absorbing rods in the embodiment of FIG. 10 along one wing of the control rod.

FIG. 10 is a view which shows another embodiment of the control rod for a nuclear reactor according to the present invention. In the present embodiment, a hafnium sheet has its thickness varied in steps so as to be thicker in the end parts of the control rod wing and to be thinner in the central part thereof and has a U-shape. Excepting this hafnium sheet 19c, the embodiment is the same as that of FIG. 4. When, in this manner, the thickness of the hafnium sheet is varied in the wing direction as indicated at A in FIG. 11, the neutron absorption rates of the neutron absorbing rods are flattened as illustrated at B in FIG. 11. When such hafnium sheet is employed and the absorbing rod at the wing outermost end is rendered the hafnium rod, the control rod lifetime becomes about 1.3 times that of the control rod in which all the neutron absorbing rods are the $B_4C$ rods. In addition, while the quantity of use of hafnium in the present embodiment is equal to that in the control rod in which the hafnium sheet having a constant thickness of about 0.2 mm is arranged, the control rod lifetime is prolonged by 5% by distributing the hafnium sheet thickness as in the present embodiment. Thus, the prolongation of the control rod lifetime can be effectively realized by varying the quantity of hafnium being the second absorber along the control rod wing. While, in the present embodiment, the hafnium sheet thickness has been varied as the steps, similar effects are produced even when it is varied continuously.

Figure 12:
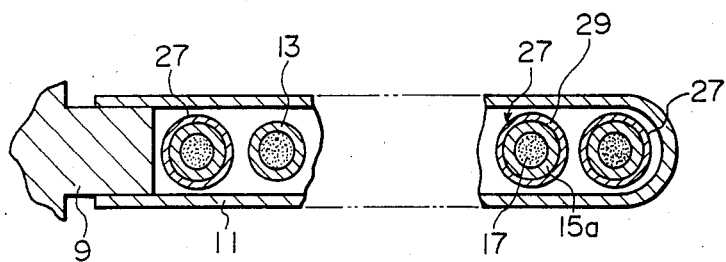
FIG. 12 is a sectional view of a control rod for a nuclear reactor in another embodiment of the present invention.

FIG. 12 shows another embodiment of the control rod for a nuclear reactor according to the present invention wherein the outer surface of a cladding is coated with a neutron absorber. A neutron absorbing rod 27 is composed of the boron carbide 17 which is a neutron absorbing substance, and the cladding 15a the outer surface of which is coated with the neutron absorber 29. The neutron absorbing rods 27 are arranged in a number of one in the central part of the control rod and in a number of four in the outermost end part of the wing, while the boron carbide-containing neutron absorbing rods 13 as in the foregoing are arranged between both the parts.

The neutron absorber 29 in the present embodiment delays the degradation of the neutron absorbing substance, and also takes partial charge of the cladding. The boron carbide encloses helium produced by the (n, $\alpha$) reaction of $^{10}B$, to swell and to incur the mechanical interaction with the cladding. A stress to act on the cladding increases with the proceeding of the burn-up of the $^{10}B$, but the strength of the cladding can be enhanced by the application of the neutron absorber. Even in a case where the cladding has cracked due to the mechanical interaction, the outflow of the boron carbide through the crack can be hindered to prevent the lowering of the control rod lifetime attendant upon the outflow of the boron carbide.

Figure 13:
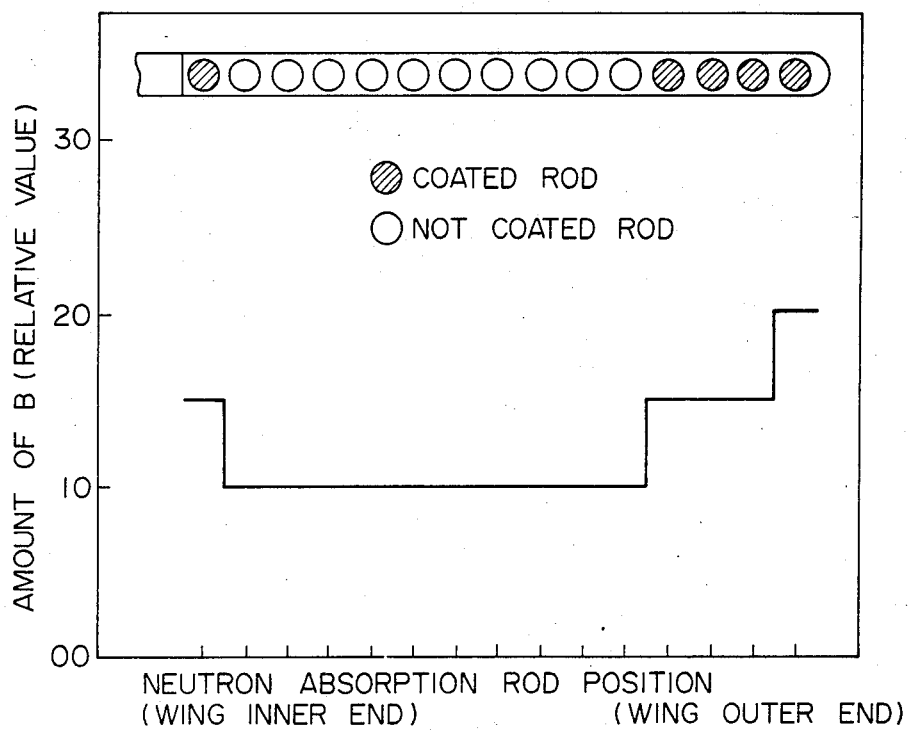
FIG. 13 is a diagram of the distribution of $^{10}B$ amounts in the wing direction of the control rod in the embodiment of FIG. 12.

In a case where the quantity of $^{10}B$ in the neutron absorbing rod is increased by enrichment or increase in the density, the neutron absorption rate rises, and the quantity of helium to be produced increases. The cladding is therefore required to have a higher strength. In this regard, when the cladding coated with the neutron absorber is employed, the neutron flux in the neutron absorbing rod lowers, so that the production of the helium can be suppressed to reduce the stress on the cladding. In addition, since the strength of the cladding can be increased as stated above, a control rod having a $^{10}B$ quantity distribution as shown in FIG. 13 can be constructed besides the arrayal of the neutron absorbing rods 13, 27 as described above. In the control rod shown in FIG. 13, the neutron absorbing rods in which $^{10}B$ degrades fast has the quantity of $^{10}B$ increased, and hence, the control rod lifetime prolongs.

Figure 14:
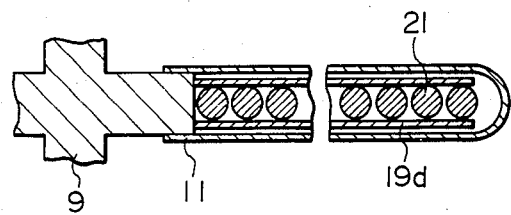
FIG. 14 is a sectional view of a control rod for a nuclear reactor in another embodiment of the present invention.
Figure 15:
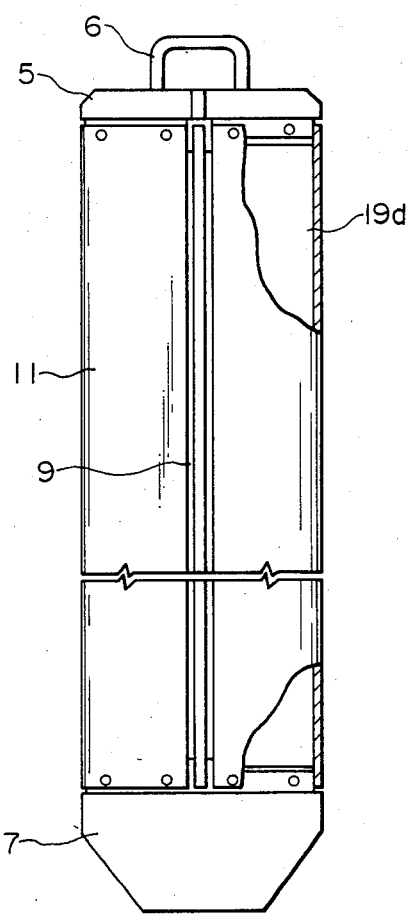
FIG. 15 is a front view, partly cut away, of the control rod for a nuclear reactor in the embodiment of FIG. 14.

An embodiment of the present invention for raising the reactivity worth of a control rod having a low reactivity worth will be described with reference to FIGS. 14 and 15. The control rod of this embodiment is such that neutron absorbing rods are hafnium rods 21 and that sheets 19d of boron-containing stainless steel are inserted in the clearances between a control rod sheath 11 and the hafnium rods. FIG. 15 shows a method of mounting the sheet in the control rod of the present embodiment. The sheet is fixed to a lower supporting plate 7 and an upper supporting plate 5 and is fitted over the full length of the control rod. The control rod composed of the hafnium rods is about 1% lower in the control rod reactivity worth than the control rod employing boron carbide, but it can be endowed with a reactivity worth equal to that of the control rod employing boron carbide by the present invention described above. Moreover, the sheets can be taken out of the control rod by detaching the upper supporting plate 5 unitary with a handle 6, so as to be replaced with new ones every fixed period (the inserting and drawing-out structure is the same as that of the embodiment in FIG. 3). Thus, when the control rod reactivity is compensated by such method, the expensive hafnium can be used for a long term.

As thus far described, when the present invention is applied to a control rod employing boron carbide, the prolongation of the lifetime of the control rod can be achieved without spoiling the merits of low price and light weight. Further, when the invention is applied to a control rod of small reactivity worth, the reactivity can be supplemented without greatly increasing the weight of the control rod, and when the invention is applied to a hybrid control rod containing boron carbide and hafnium, the effective utilization of the expensive hafnium is permitted.

What is claimed is:

1. A control rod for a nuclear reactor comprising a central supporting member which extends in an axial direction of said control rod; sheaths which are arranged in the shape of a cross in a radial direction and which are mounted on said central supporting member; a plurality of neutron absorbing rods which are received in said each sheath and which are arrayed in a row in the radial direction; a lower supporting member which is disposed under said sheaths and which supports said neutron absorbing rods; at least one neutron absorbing hafnium sheet which is located between an inner wall of said each sheath and said row of neutron absorbing rods so as to absorb some of neutrons directed toward said neutron absorbing rods; and an upper supporting member which is mounted on said sheaths and said central supporting members.

2. A control rod for a nuclear reactor as defined in claim 1, wherein said each neutron absorbing rod is composed of cladding and boron carbide powder packed therein.

3. A control rod for a nuclear reactor as defined in claim 1, wherein said hafnium sheet is thicker in end parts said row of the neutron absorbing rods than in a central part thereof.

4. A control rod for a nuclear reactor comprising:
a plurality of neutron absorbing rods arranged in a row, each neutron absorbing rod containing a cladding and boron carbide powder packed in said cladding;
sheath means extending in the direction of said row for containing said row of neutron absorbing rods therein, said sheath means having a wall surface spaced from said row of said neutron absorbing rods contained therein; and
hafnium sheet means extending at least in the direction of said row and disposed in a gap between at least a portion of the wall surface of said sheath means and at least a portion of said row of said neutron absorbing rods, said sheath means containing said hafnium sheet means and said row of neutron absorbing rods therein.

5. A control rod for a nuclear reactor as defined in claim 4, wherein said hafnium sheet means includes a pair of thin hafnium sheet members arranged to have oppositely facing surface portions spaced from one another with said row of neutron absorbing rods being interposed between said oppositely facing surface portions of said pair of hafnium sheet members so that one sheet member faces on side of said row of neutron absorbing rods.

6. A control rod for a nuclear reactor as defined in claim 5, wherein said pair of hafnium sheets members are independent of said sheath means and absorb a portion of neutrons directed toward said neutron absorbing rods.

7. A control rod for a nuclear reactor as defined in claim 5, wherein said pair of hafnium sheet members are joined at one end so as to provide a U-shape.

8. A control rod for a nuclear reactor as defined in claim 5, further including a round solid rod of hafnium disposed at one end of said row of neutron absorbing rods for absorbing neutrons.

9. A control rod for a nuclear reactor as defined in claim 5, wherein each of said hafnium sheet members extending in the direction of said row has a smaller thickness in a central part thereof than in the end parts thereof.

10. A control rod for a nuclear reactor as defined in claim 9, wherein said pair of hafnium sheet members are joind at one end so as to provide a U-shape.

11. A control rod for a nuclear reactor as defined in claim 5, wherein said thin hafnium sheet members have a length of about $\frac{1}{4}$ of a length of said neutron absorbing rods, said thin hafnium sheet members being arranged so as to face only a top end part of said row of neutron absorbing rods.

12. A control rod for a nuclear reactor comprising:
a plurality of sheaths each elongated axially and extending radially, said sheaths being arranged so as to be cruciform in a plane perpendicular to the axial direction;
a plurality of neutron absorbing rods inserted in each of said plurality of sheaths so that said neutron absorbing rods within said each sheath are in a row extending in the radial direction, each of said neutron absorbing rods being constituted of a cladding and boron carbide powder packed in said cladding;
a plurality of thin hafnium sheets, a respective sheet being disposed in a gap defined between a respective sheath and one of the opposite sides of said neutron absorbing rods in said row so as to absorb part of neutrons to be directed to each of said neutron absorbing rods, said thin hafnium sheets being independent of said sheaths and said neutron absorbing rods and having substantially the same width in the radial direction as one of said neutron absorbing rod rows;
a lower supporting member, connected to lower portions of said sheaths, for supporting said plurality of neutron absorbing rods and said plurality of thin hafnium sheets; and
an upper supporting member, mounted on upper portions of said plurality of sheaths, for supporting said plurality of sheaths.

13. A control rod for a nuclear reactor as defined in claim 12, wherein said hafnium sheets have substantially the same length as one of said neutron absorbing rods.

14. A control rod for a nuclear reactor as defined in claim 12, wherein each of said thin hafnium sheets is connected to said upper supporting member so as to be removable with said upper supporting member.

15. A control rod for a nuclear reactor as defined in claim 12, further including a round solid rod of hafnium disposed at a radial outermost end of said neutron absorbing rod row.

16. A control rod for a nuclear reactor as defined in claim 12, wherein each of said thin hafnium sheets is 0.3 mm thick.

* * * * *